United States Patent [19]
White, Jr.

[11] 3,834,229
[45] Sept. 10, 1974

[54] METHOD AND APPARATUS FOR MEASURING WATER CURRENTS

[76] Inventor: Henry J. White, Jr., 18 Pelican Isle, Fort Lauderdale, Fla. 33301

[22] Filed: Aug. 12, 1971

[21] Appl. No.: 171,147

[52] U.S. Cl............................................. 73/170 A
[51] Int. Cl............................................. G01w 1/00
[58] Field of Search ....... 73/170 A, 188, 189; 9/8 R

[56] References Cited
UNITED STATES PATENTS

| | | | |
|---|---|---|---|
| 2,688,250 | 9/1954 | Roberts................................. | 73/189 |
| 3,372,585 | 3/1968 | Niskin............................... | 73/170 A |
| 3,623,362 | 11/1971 | Gerard................................. | 73/189 |

OTHER PUBLICATIONS

Zdanovich et al., Application of Aeromethods for Investigation of the Ocean, Foreign Technology Division, Wright-Patterson Air Force Base, Ohio, Apr. 7, 1967.

V. G. Zdanovich, Methods for Studying Ocean Currents by Aerial Survey, Akademiya Nauk USSR, 1964, pp. 124–127, available U.S. Dept. of Commerce, Clearinghouse for Fed. Scientific and Tech. Information, TT66–51148.

Primary Examiner—Richard C. Queisser
Assistant Examiner—John P. Beauchamp
Attorney, Agent, or Firm—Bacon & Thomas

[57] ABSTRACT

An instrument package containing three float markers is dropped into a body of water, a first one of the markers being designed to float on the surface. The second and third markers sink to a subsurface level and then are released with a predetermined time delay therebetween, whereupon they ascend to and float on the surface. The relative positions of all three float markers are then charted, and from such chart and the elapsed times both the water current velocity $V_S$ at the surface and the average current velocity $\bar{V}$ from the subsurface level to the surface are calculated.

25 Claims, 9 Drawing Figures

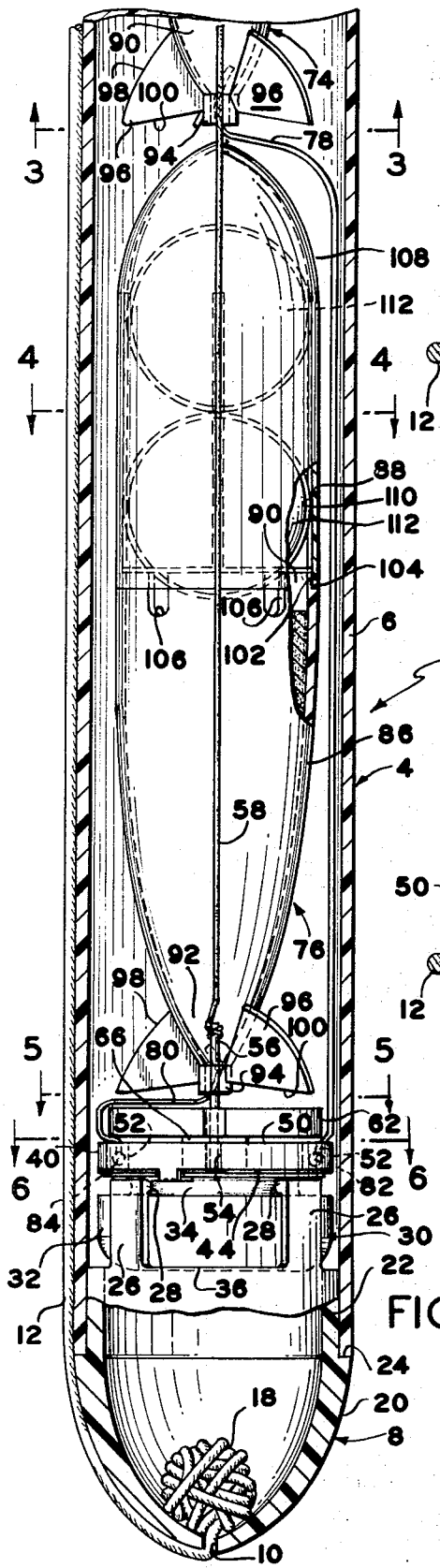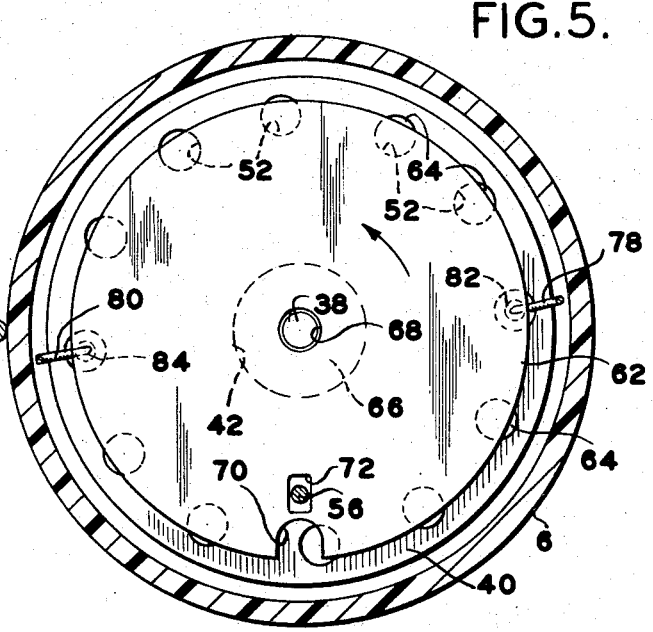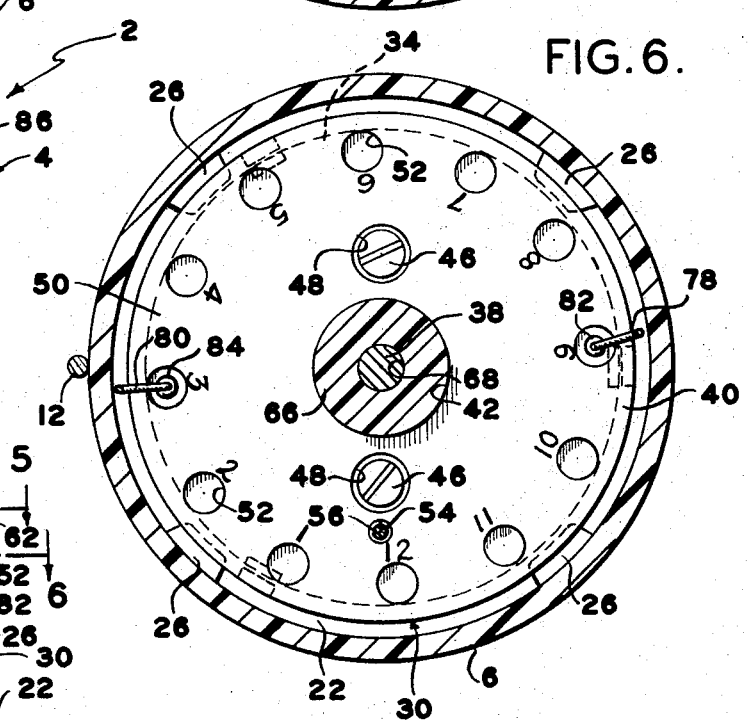

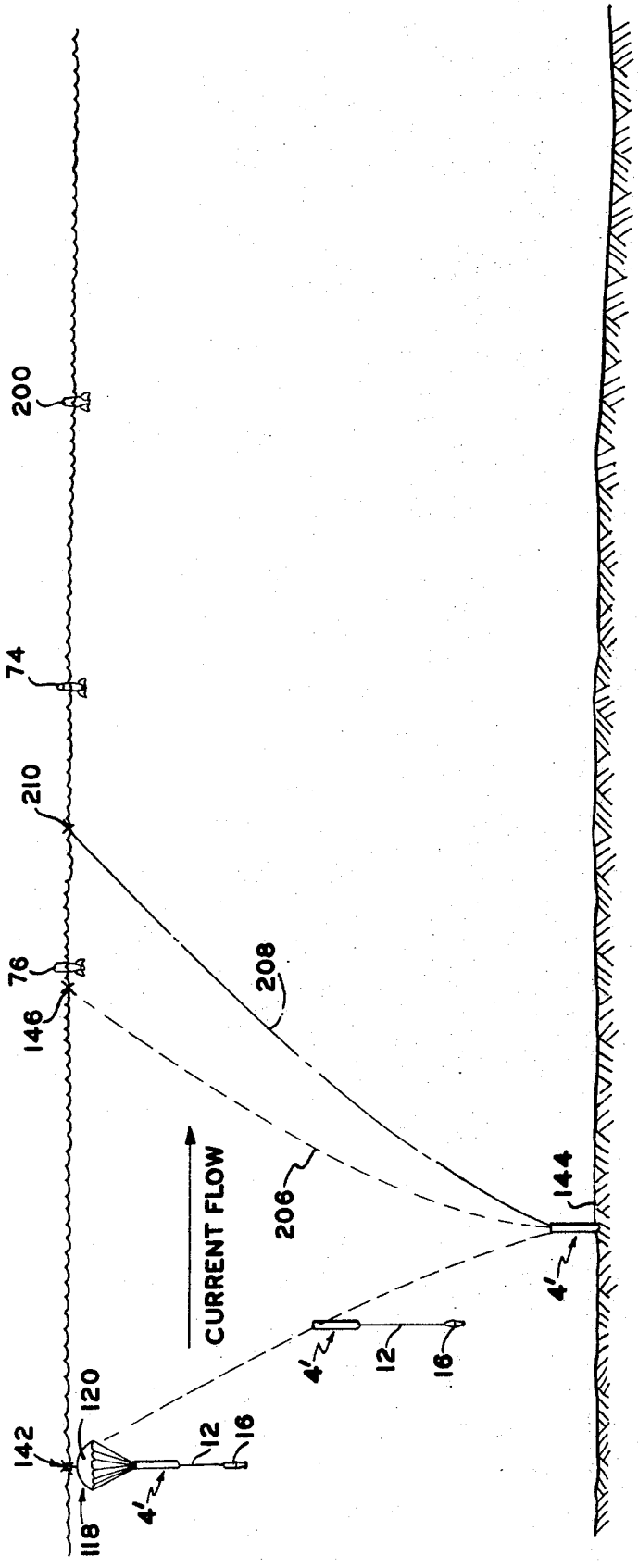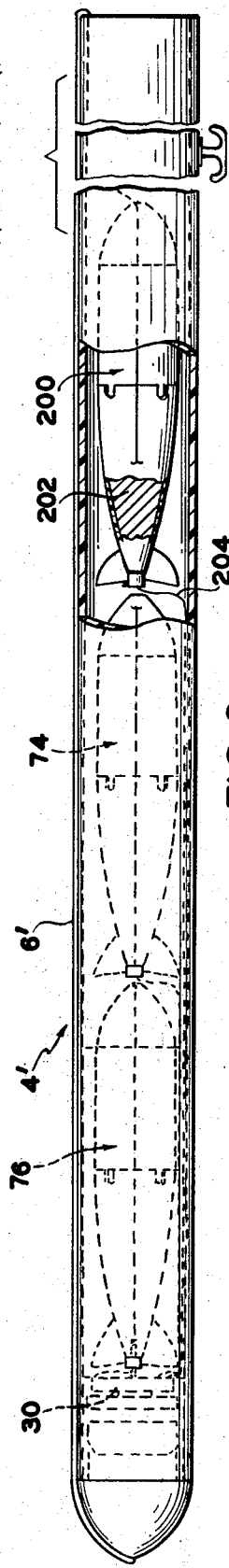

METHOD AND APPARATUS FOR MEASURING WATER CURRENTS

BACKGROUND OF THE INVENTION

1. Field of the Invention

The present invention relates generally to methods and apparatus for measuring not only surface velocity, but also the integrated or average current flow from a subsurface level to the surface of a body of water.

2. Description of the Prior Art

A knowledge of the direction and velocity of water currents in the ocean and other large bodies of water can be invaluable information, for many purposes. There have been methods devised for measuring surface currents remotely from aircraft, such methods usually involving dropping floats containing a dye marker on the surface of the water, the position of such floats at two different points in time being photographed from the air. By comparing the initial and final locations and bearings with elapsed time, the value of the surface current can be evaluated.

Valuable as is a knowledge of surface currents, of greater value to the oceanographer or analyst is knowledge of the undersurface currents. If the integrated velocity $\overline{V}$ of a moving body of water over a given depth is known, then the volume of water transported can be calculated. This information is of importance to calculate the concentration of added pollutants to a body of water, to determine quantities of thermal energy transported from one geographic area to another, as by the Gulf Stream, to aid in submarine navigation and undersea warfare, and for other reasons.

However, until now no system has been offered whereby both the surface velocity $V_S$ and the integrated velocity $\overline{V}$ of subsurface currents in a body of water can be measured from aircraft or the like. Because of the usefulness of such information there is thus a need for a method and apparatus capable of determining both surface velocity $V_S$ and integrated velocity $\overline{V}$ of a body of water, a need which the present invention is intended to satisfy.

SUMMARY OF THE INVENTION

The novel apparatus of the present invention includes an instrument package that is dropped into a body of water, comprising a hollow torpedo housing containing a clock mechanism in one end, and into which are initially packed a pair of floats designed for underwater release, an anchor weight attached to the tip of the torpedo housing by a lanyard, and a parachute having a surface float marker detachably connected thereto. The surface float marker and the two underwater floats preferably contain conventional dye compound that will spread in the water to form an easily seen configuration, although a smoke producing compound or other element that will provide a location-determining signal might be used instead.

When the package is dropped from an airplane the anchor weight falls from the torpedo housing, deploying the parachute. The parachute in turn helps to guide the descent of the package to the body of water. The surface float marker is detachably connected to the parachute by being contained in a water soluble bag attached thereto, and when the package enters the water the marker bag is quickly desolved to release the surface float marker at the point of entry. Thereafter the surface float marker is moved about by the surface current at the velocity $V_S$, and the dye contained therein begins to spread to mark the location of the surface marker in the water.

The two underwater floats are releasably connected to the clock mechanism by short tether lines, and the clock mechanism itself is initially immobilized by a release pin attached to the inner end of a trip cord. The rear or upper end of the torpedo housing has an opening in the sidewall thereof, and the central portion of the trip cord is initially doubled or looped and pulled through said opening and wrapped about the exterior of the housing in the manner of a capstan, where it is secured by a piece of water-soluble tape. The outer end of the trip cord is connected to the parachute, the capstan arrangement being effective during descent of the package to the water for preventing strain on the inner end of the trip cord, whereby the release pin is not distrubed.

Once in the water, the tape securing the capstan arrangement disolves, freeing the trip cord. Thereafter, as the anchor weight pulls the torpedo housing to the bottom the parachute drags in the water, such drag undoing the loop in the trip cord and causing the release pin to be pulled, whereupon the clock mechanism is activated.

The clock mechanism is arranged to release the two underwater floats one at a time from the bottom or some other selected subsurface level, with a predetermined time delay therebetween. The underwater floats rise to the surface when released, and are equipped with special spiral-shaped fins that cause them to rotate during their ascent, such rotation helping to guide them along a smooth ascent path. On the surface the floats release the dye carried therein, whereby their position is clearly marked.

After the two underwater floats have had time to surface, the body of water is overflown, and the relative positions of the surface float marker and the two underwater floats are photographically charted. The resultant chart is then analized in conjunction with the elapsed times to determine both $V_S$ and $\overline{V}$ for the body of water.

The surface current velocity $V_S$ is easily determined by comparing the on-surface position of the two underwater floats with the time delay between their release, the spacing between the two being the product of the surface current velocity $V_S$ and such time delay. With $V_S$ determined, $\overline{V}$ can then be calculated.

The distance at the time of charting between the surface float marker and the first-released of the two underwater floats is made up of two factors. The first factor is simply the distance travelled by the surface marker from when the package enters the water to when the first underwater float surfaces, which time period is known.

The second factor is in the effect of the average undersurface current velocity $\overline{V}$ on the first underwater float, an effect which occurs twice, once during descent of the package from the surface, and once during ascent of the first underwater float to the surface. Since the depth of the body of water is known, and with the rate of descent of the package and the rate of ascent of the first underwater float both having been previously determined, the elapsed times for descent and ascent are also known. By utilizing the known elapsed times for the package to reach its subsurface level and for the first underwater float to ascend to the surface, and the previously calculated value for $V_S$, the average integrated velocity $\overline{V}$ of the undersurface current is easily calculated. With $\overline{V}$ known, the water transport beneath the surface can then be determined.

In some instances where operations are conducted in very deep water the surface marker when released at the surface may drift too far under the influence of $V_S$ for later photographic charting. To provide for this possibility, a second embodiment of the invention contemplates carrying the surface marker to the subsurface level, where it is released. By utilizing a surface marker having a different buoyancy than the two underwater $V_S$ measuring floats, the underwater-released surface marker will be affected by $\overline{V}$ for a different period of time during its ascent than the two $V_S$ floats, and with the ascent times known for all the markers $\overline{V}$ can thereafter be easily determined. It can also be desirable in some instances to use two or more underwater released surface markers, when working in deep water.

It is the principal object of the present invention to provide a method and apparatus for determining both the surface current velocity $V_S$ and the average velocity $\overline{V}$ from a subsurface level to the surface of a body of water remotely as from an aircraft.

Another object is to provide an instrument package for current measurement that is of rugged construction, and yet which is simple and reliable in operation.

A further object is to provide an instrument package utilizing a timer and a unique arrangement for periodically releasing underwater floats.

Yet another object is to provide an underwater float designed to ascend through a body of water along a smooth path when released from a subsurface level.

Other objects and many of the attendant advantages of the present invention will become readily apparent from the following Description of the Preferred Embodiment, when taken together with the accompanying drawings.

BRIEF DESCRIPTION OF THE DRAWINGS

FIGS. 2 and 2A are an axial sectional view of the torpedo-like instrument package of the invention, showing the components thereof and how they are arranged just prior to launching or dropping of the package;

FIG. 5 is an enlarged sectional view taken on the line 5—5 in FIG. 2A, showing in detail the release disk of the clock mechanism;

FIG. 6 is an enlarged sectional view taken on the line 6—6 in FIG. 2A, showing the base disk of the clock mechanism;

FIG. 7 is a diagrammatic view like FIG. 1 showing a second embodiment of the invention, wherein the surface marker is carried to a subsurface level and then released; and FIG. 8 is a view, partly broken away, showing a modified torpedo-like instrument package for use with the embodiment of FIG. 7, wherein the cylindrical tube is made longer to receive an underwater-released surface marker that is weighted to give it a different buoyancy than the two underwater floats.

DESCRIPTION OF THE PREFERRED EMBODIMENT

Figure 1:
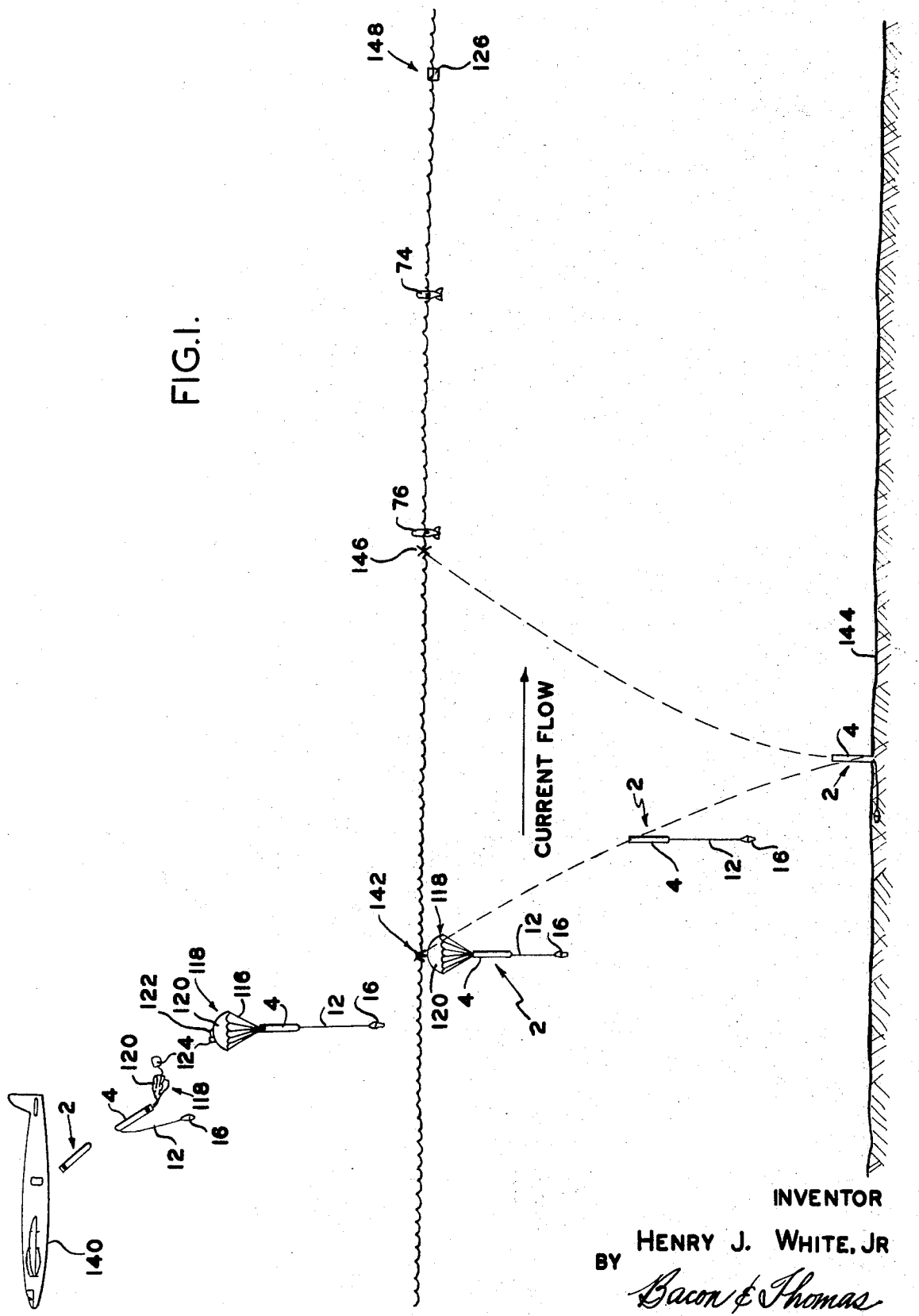
FIG. 1 is a diagrammatic view illustrating how the instrument package is deployed from an aircraft, enters the water, and sinks to a subsurface level, how the surface float marker and the two underwater floats are released and move about on the surface, and how the undersurface current flow affects descent of the instrument package and ascent of the underwater floats.

Referring now to the drawings, the apparatus of the present invention comprises an instrument package 2, including a torpedo housing 4 that comprises a cylindrical tube 6 having a hollow nose cone 8 received and secured in one end thereof, the nose cone 8 having an opening 10 in the tip thereof through which a lanyard 12 extends, the free end of the lanyard 12 being tied to a loop 14 formed on an anchor weight 16. The anchor weight 16 has a diameter substantially less than the internal diameter of the tube 6, and a length at the secured end of the lanyard 12 is formed into a coil 18 that is received within the hollow nose cone 8, the secured end of said lanyard being arranged to prevent such from being pulled outwardly through the opening 10.

The nose cone 8 includes a dome 20 from the base end of which a cylindrical sleeve 22 extends, a stop shoulder 24 being formed at the juncture of the sleeve 22 and the dome 20, and said sleeve having an external diameter just slightly less than the internal diameter of the tube 6. The outer end of the sleeve 22 has four circumferentially spaced, axially extending retainer fingers 26 thereon, each having an inwardly directed flange 28 on its outer end. A mechanical clock timer 30 is carried by the retainer fingers 26, said timer including a housing 32 having an annular groove 34 therein positioned to receive the retainer flanges 28 when the base end 36 of the housing 32 is seated on the inner end of the sleeve 22.

The timer 30 is similar to the type used for ovens or in the darkroom, and includes a central shaft 38 that projects from the housing 32, and is connected with the clockwork mechanism contained within said housing. The shaft 38 of such a timer has an initial at rest position, and is rotated in one direction therefrom to wind the timer. When the shaft is then released, it rotates in the opposite direction toward its initial position at a measured rate controlled by the clockwork.

Received on the upper face of the timer 30 is a base disk 40 having a large central opening 42 therein, said disk being secured to the flat upper face 44 of the housing 32 by screws 46, the heads of which are received in recesses 48 formed in the top face of 50 of the disk. Arrayed on a circle near the periphery of the base disk 40 are twelve evenly spaced axial bores or chambers 52, the peripheral circle on which said chambers are arrayed being concentric of the central opening 42 and the shaft 38.

The chambers 52 are number 1 through 12 on the base disk 40, as shown in FIG. 6, and the annular spacing therebetween represents a predetermined time period equal to one-twelfth the time it takes for the shaft 38 to make a complete revolution once it has been released from a wound position. Thus, if it takes twelve minutes for the shaft 38 to revolve once, than the annular distances between the chambers 52 represent 1 minute each. The base disk 40 also has an axial bore 54 therein disposed radially inwardly from the chambers 52, which is adapted to receive the free end of a release pin 56 having one end of a thin line 58 secured to its opposite end, the other end of the line 58 being tied to one end of a trip cord 60.

Received on the shaft 38 is a release disk 62, said disk, as shown in FIG. 5, having a diameter that is greater than the diameter of a circle passing through the centers of the chambers 52, but which is slightly less than the diameter of a circle that would tangentially engage the outer edges of all the chambers 52. Thus, as shown in FIG. 5, while the release disk 62 overlies nearly the whole of each chamber 52, there is a small space 64 at the outer edge of each chamber 52 that lies exposed.

The lower face of the release disk 62 has a centrally disposed cylindrical boss 66 thereon having a diameter slightly less than that of the central opening 42 in the base disk 40, and said release disk 62 has a centrally disposed axial bore 68 therein that receives the shaft 38 in a force fit to thereby secure the release disk on said shaft. The periphery of the retainer disk 62 has a single release notch 70 therein, which allows complete exposure of any chamber 52 over which it passes, and inwardly thereof said disk has an axial opening 72 therein through which the release pin 56 passes.

The timer 30 with its attached base and retainer disks 40 and 62 is designed to anchor first and second underwater floats 74 and 76 within the torpedo housing 4, until release thereof is desired. The floats 74 and 76 have long and short tether lines 78 and 80, respectively, connected thereto, the lower free ends of said tether lines respectively having enlarged anchor balls 82 and 84 thereon. The timer mechanism 30 works in the following manner.

Assembly of the floats 74 and 76 to the timer 30 is made before the nose cone 8 is installed on the tube 6. The time period from when the instrument package 2 enters the water to when release of the first float 74 is desired is determined, as is the time interval desired between the release of the floats 74 and 76. The chambers 52 to be utilized are then determined based on the desired time intervals, by first counting from the location of the release pin retaining bore 54 to the chamber 52 associated with the time at which release of the first float 74 is desired, and then counting from that chamber to the one associated with the desired release of the second float.

For purposes of illustration, assume a one minute spacing between the chambers 52, and that release of the first float 74 is desired 3 minutes after the instrument package 2 enters the water, and release of the second float 76 is desired 6 minutes later. Referring to FIGS. 5 and 6, the chamber 52 marked "9" would then be used for the float 74, and the chamber "3" for the float 76, assuming counterclockwise movement for the wound shaft 38.

With the chambers 52 selected, the release disk 62 is turned clockwise until the notch 70 aligns with the chamber 52 marked "3," whereupon the anchor ball 84 is placed in said chamber, and the release disk 62 is turned further. When the notch 70 passes by the chamber 52 marked "3," the anchor ball 84 is trapped therein, the tether line 80 passing through the small space 64 between the edge of the chamber 52 and the edge of the disk 62. The second anchor ball 82 is then similarly installed, and the release disk is then turned to align the opening 72 with the bore 54, whereupon the release pin 56 is installed.

With preparation of the timer 30 thus complete, the two floats 74 and 76 and the trip line 60 are placed in the tube 6, and the nose cone 8 is inserted into one end of the tube and is secured in place, as by adhesive, or with staples, screws or other fasteners. When the release pin 56 is later pulled during operational use of the instrument package 2, the release disk 62 will rotate counterclockwise at a measured, time rate to release the tethers 78 and 80 in proper sequence, at the proper time.

The first and second underwater floats 74 and 76 are of identical construction, and are especially designed so that when released they will rise to the surface smoothly and without wobbling about. The floats 74 and 76 each include a base portion 86 and a nose portion 88 both made of plastic, the base portion 86 having a circular cross-section and tapering smoothly downwardly in diameter from a maximum at its forward open end 90 to a minimum at its tail end 92, the tail end 92 having a hollow cylindrical collar 94 thereon for receiving one end of the tether 78 or 80 used to anchor the float to the timer 30.

Figure 3:
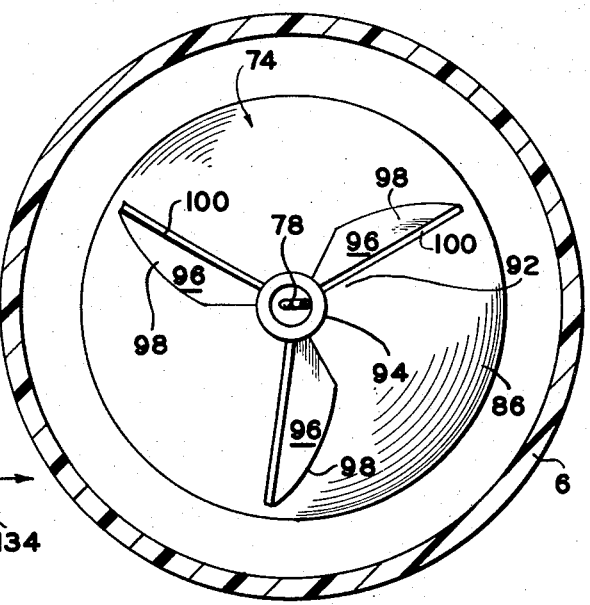
FIG. 3 is an enlarged sectional view taken on the line 3—3 of FIG. 2A, showing in an end elevation the spiral-shaped fins on the first underwater float.
Figure 4:
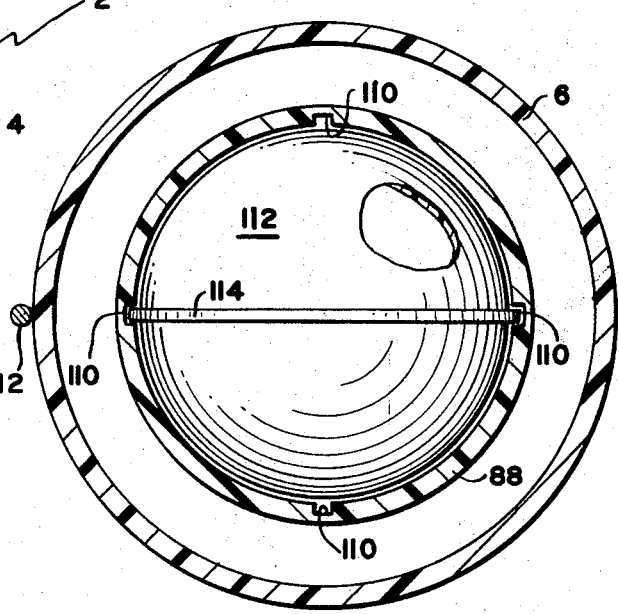
FIG. 4 is an enlarged sectional view taken on the line 4—4 in FIG. 2A, showing the interior of one of the underwater floats, and one of the flotation spheres contained therein.

Secured to the tail end 92 of each float 74 and 76 are three equally spaced radial fins 96, each including a rounded leading edge 98 and a straight trailing edge 100. The body of each fin 96 is twisted in a smooth curve to form a part of a spiral or helix, as is best shown in FIG. 3, all of the fins 96 being twisted in the same way. The purpose for the spiral or helically shaped fins 96 is to impart a rotary motion to their associated floats 74 and 76 as such move through the water, such motion having much the same effect on the floats as it does on a rifle bullet. That is, the rotary motion thus imparted to the floats 74 and 76 gives them stability and prevents wobbling, and causes them to ascend through the water along a smooth and regular path.

The upper end 90 of the base body portion 86 is stepped and has a ridged flange 102 thereon, which snaps into an annular groove 104 at the open rear end of the nose portion 88 to secure the two halves of the float together. In addition, the upper end 90 of the base portion 86 has four axially extending notches 106 therein, which provide access for water to enter the floats 74 and 76 to mix with and carry out dye compound contained therein. The marking dye (not shown) is placed within the base body portion 86 within a suitable sack or container, and can be of the fluoroscein or rhodamine type.

The nose portion 88 of the floats 74 and 76 is cylindrical near its open end, and terminates in a tapered nose cone 108. The interior wall of the cylindrical portion of the nose 88 has four equally spaced, axially extending grooves 110 therein, and received within said nose portion are two hollow buoyancey spheres 112, each having a diametrically positioned flange 114 thereon. The flanges 114 are slidably received in the grooves 110, and the spheres 112 are designed to withstand great depths without collapse and serve to give sufficient buoyancy to the marker dye-carrying floats 74 and 76 such that they will ascend to the surface of a body of water when released from a subsurface level.

The free outer end 115 of the trip cord 60 is tied to the free ends of the shroud cords 116 of a parachute 118, the parachute 118 including a canopy 120. Attached to the center of the canopy 120 by a cord 122 is a bag 124 within which is received a surface float marker 126, the marker 126 being designed to float on the surface of a body of water and containing marking dye in a bag or container, or dispersed among flotation chips made of foam plastic. The bag 124 is made of a material that is nearly instantly dissoluble in water, such as clear polyvinyl alcohol film. Thus, when the parachute 118 enters the water, the bag 124 disolves to release the surface float marker 126 at the point of entry into the body of water of the instrument package 2.

Figure 2:
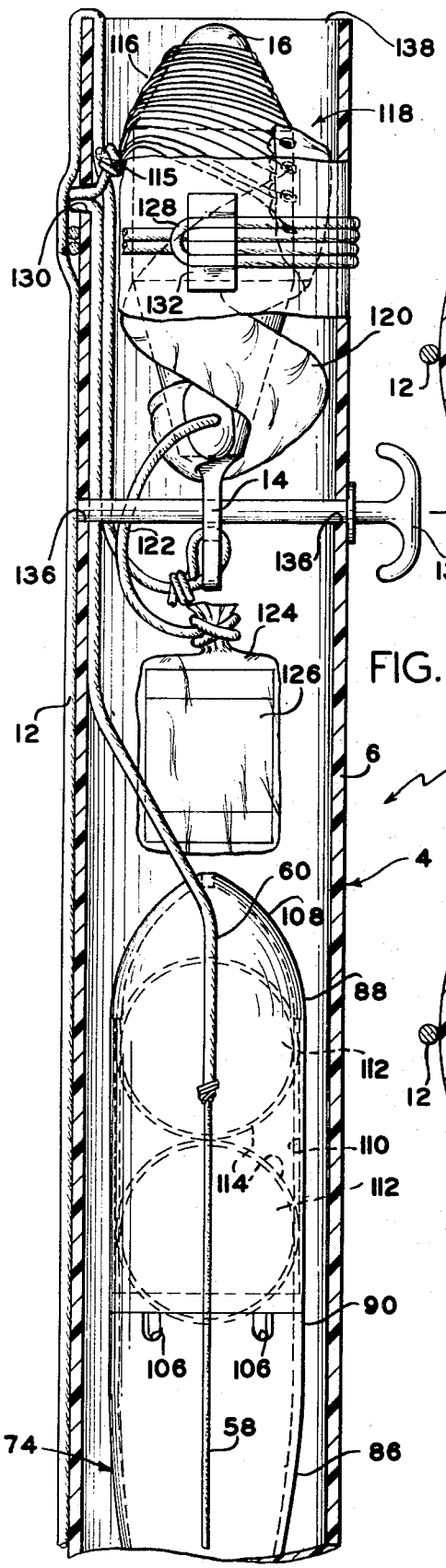

The various elements of the instrument package 2 are shown in FIGS. 2 and 2A as they are assembled for use, it already having been described how the timer 30, the floats 74 and 76, the trip cord 60, and the nose cone 8 are assembled to the tubular body 4. When this has been done, the trip cord 60 is looped or doubled at 128, and the looped portion is pulled through an opening 130 in the tube 6 near its open rear end, this being done with care so as not to unseat the release pin 56. The doubled portion of the trip cord 60 is then wrapped about the exterior of the tubular member 6, and the loop 128 is secured by a piece of water-soluble tape 132. The result is a capstan arrangement, wherein the parachute 118 can place strain on the free end 115 of the trip cord 60 without danger of pulling the release pin 56, so long as the loop 128 is held secure by the tape 132.

With the capstan arrangement in place the parachute 118 is then wrapped about the body of the anchor weight 16, and the body 124 with the marker 126 therewithin together with the parachute-wrapped weight 16 are then placed in the open end of the tube 6, where they are temporarily secured by a safety pin 134 passed through the weight loop 14 and aligned bores 136 in the tube 6. The instrument package 2 is then complete, and is ready for shipment. It should be observed that the anchor weight lanyard 12 at this time extends along the length of the torpedo housing 4 from the nose cone 8 to the open rear end 138, passing outside of the wrapped, doubled portion of the trip cord 60.

The instrument package 2 is especially designed to be launched or dropped from an aircraft into a body of water, although it can be launched in other manners. Referring to FIG. 1, the way in which the package functions when dropped from an aircraft will be described.

Just prior to launching the safey pin 134 is removed, to free the anchor weight 16. When the instrument package 2 is subsequently dropped from an aircraft 140 the anchor weight 16 will fall from the open end 130 of the torpedo housing 4, allowing the parachute 118 to deploy. The anchor weight 16 will then swing downwardly on the lanyard 12, and the parachute 118 will tend to guide the torpedo housing 4 so that the package 2 will enter the water smoothly and with the nose cone 8 pointing downwardly. Upon contact with the water the bag 124 will disolve to launch the surface float marker 126 at the point of impact 142, and the tape 132 will disolve to free the loop 128.

The anchor weight 16 will now pull the instrument package 2 toward the bottom, with the parachute 118 dragging behind. The parachute drag will undo the capstan arrangement of the trip cord 60, whereupon the release pin 56 will be pulled to start the timer 30.

As the instrument package 2 sinks, it will be subject to the subsurface current flow. Such subsurface flow will cause the package 2 to be displaced laterally from its point of entry 142, until it comes to the desired subsurface level, which in FIG. 1 is the bottom 144.

After the instrument package 2 reaches the desired subsurface level, the timer 30 releases the first underwater float 74, which then rises to the surface of the body of water, emerging at a point 146. The float 74 will rise evenly because of the rotary motion imparted thereto by the twisted spiral fins 96, but nevertheless will be laterally displaced during its ascent by the undersurface current. The timer 30 can be set to release the first float 74 immediately upon contact with the bottom 144, or at some time thereafter.

Subsequently, the second underwater float 76 will be released, and will rise to the surface along substantially the same path as the float 74 to also emerge at point 146, assuming a relatively constant underwater current. The roles of the torpedo housing 4 and its timer 30 are now complete, and all three of the surface marker 126 and the underwater floats 74 and 76 will emit marking dye so that their positions will be easily seen. It is to be understood, of course, that in lieu of marking dye floats utilizing smoke, lights or some other suitable signal might be used.

During the time required for the instrument package to sink to the bottom 144, and for the floats 74 and 76 to rise to the surface, the surface marker float 126 is subjected to the surface current, and is moved from the point of entry 142 to a removed position 148. However, because the surface float 126 was launched at the point of entry 142 its ultimate location bears a given relationship to the value of the surface current $V_S$ and the elapsed times, whereby its presence makes possible the calculation of the average underwater current velocity $\overline{V}$, which is the same current that caused the instrument package 2 to be laterally displaced during descent, and the underwater floats 74 and 76 to be further displaced laterally during their ascent.

After the second underwater float 76 has surfaced, a chart is made of the ocean surface showing the relative positions of the three floats 74, 76 and 126. This can be done by aerial photography, using known techniques. From this chart, and given certain other data, the value for $V_S$ and $\overline{V}$ can be calculated.

The surface velocity is easily calculated from the relative positions of the two underwater floats 74 and 76. Since both of these floats were subject to the same conditions of ascent from the bottom 144, the spacing therebetween as disclosed by the chart is the result of the surface current velocity $V_S$, as applied to the first surfacing underwater float 74 from the time it emerged at point 146 until the float 76 similarly emerged. Expressed mathematically in the X direction of a two dimensional Cartesian coordinate system, this relationship is as follows:

$$V_S = X_2 - X_3/t_d$$

(1)

where $V_S = X$ component of surface current velocity
$X_3 = $ position of the second underwater float 76 when data is collected $X_2$ = position of the first underwater float 74 when data is collected.

$t_d$ = time delay between underwater release of floats 74 and 76

Once $V_S$ has been determined, $\overline{V}$ can be found. For this calculation the time required for the instrument package 2 to sink to its subsurface level, and for the floats 74 and 76 to ascend, needs to be known. The rates of descent and ascent can be experimentally determined for the specific instrument package and underwater floats being utilized, and the depth of the body of water under examination will be known from charts, or can be easily found using conventional depth finding equipment. Given the rates of descent and ascent, and the depth, it is a simple matter to calculate the elapsed time required for descent of the instrument package 2 and ascent of the floats 74 and 76. The Y components of $V_s$ and $\overline{V}$ can be likewise obtained.

The difference between the final locations of the surface float 126 and the first underwater float 74 is the result of the effects of the surface current velocity $V_S$ on the float 126 over the elapsed time from when the instrument package 2 entered the water to when the first underwater float emerged, as modified by the effects of the average undersurface current $\overline{V}$ during descent and ascent. The interelationships are such that if $V_S$, the spacing and the elapsed times are known, $\overline{V}$ can be calculated, Expressed mathematically in the X direction, the relationship can be stated as follows:

$$\overline{V} = V_s (t_2 + t_p + t_{d02}) - (X_1 - X_2)/t_2 + t_p \quad (2)$$

where $\overline{V}$ = X component of vertically average current velocity from selected subsurface level to the surface.

$V_S$ = X component of surface current velocity
$X_1$ = position of the surface marker float 126 when data is calculated
$X_2$ = position on the first underwater float 74 when data is taken
$t_2$ = time for the first underwater float to rise to the surface
$t_p$ = time for the instrument package 2 to sink to the selected subsurface level
$t_{do2}$ = time delay between arrival of the instrument package 2 at the selected subsurface level and release of the first underwater float It is thus seen that the use of the surface float 126 in conjunction with the two subsurface floats 74 and 76 make it possible to find $\overline{V}$, it being understood that different ways of examining the concept mathematically are possible, and that different factors can be taken into account, such as a time delay between when the instrument package 2 reaches the bottom 144 and when the first float 74 is released.

According to the method of the invention, an instrument package is dropped into a body of water, and releases a float on the surface. The remainder of the package sinks to a selected subsurface level, and then two underwater floats are released with a known time delay therebetween. The positions of the three floats are then charted, and the value of $V_S$ is determined by comparing the spacing between the two underwater floats with the time delay between their release. Then, the value of $\overline{V}$ is determined, by comparing the value of $V_S$ with the spacing between the surface float and the first underwater float, and the elapsed time for the instrument package to sink and for the first underwater float to rise.

More specifically, the value of $V_S$ is found by dividing the spacing between the first and second underwater floats by the time interval between their release, and the value of $\overline{V}$ is found by subtracting from $V_S$ the answer obtained by dividing the spacing between the first underwater float and the surface float by the sum of the time required for the instrument package to sink and for the first underwater float to ascend.

It is also possible to take further readings of the underwater current by releasing additional floats from the instrument package as it descends, using timers or pressure-activated catches. The data is analyzed in a manner similar to that hereinabove described.

Referring now to FIGS. 7 and 8, a second embodiment of the invention is shown wherein a surface marker 200, constructed like the underwater floats 74 and 76 except that it contains ballast 202, is carried to the subsurface level 144 and released, rather than being released on the surface like the marker 126. This arrangement is preferable when working in very deep water, where during the time required for the operating cycle of the floats 74 and 76 the surface marker may move so far from the scene that such interferes with photographic charting.

The underwater-released surface marker 200 is provided with the ballast 202 so that it has a buoyancy different from that of the floats 74 and 76, say one-half, whereby a different rate of ascent results. Obviously, a different rate of ascent can also be obtained by means other than a change in buoyancy, if desired. The cylindrical housing 6' of the modified torpedo-like instrument package 4' is longer than the housing 4 to accommodate the underwater marker 200, but otherwise the package 4' is identical to the package 2. The underwater-released marker 200 is connected to the timer 30 by a tether line 204, and is released thereby just like the floats 74 and 76, and before the release of the latter.

When the underwater marker 200 is released it rises to the surface. However, because it has a buoyancy different from that of the underwater floats 74 and 76, it will not follow the ascent path 206 of such floats, but rather will follow its own ascent path 208. Being of less buoyancy, the marker 200 will take longer to rise, which means it is exposed to the current flow $\overline{V}$ longer than are the floats 74 and 76, which causes the different ascent path 208 that brings the marker 200 to the surface at a point 210 spaced from the emerging point 146 of the floats 74 and 76. The time for ascent of the marker 200 is predetermined experimentally and from calculations, just as is done for the floats 74 and 76.

It is obvious that the final surface displacement of the underwater-released surface marker 200 from the first-released underwater float 74 is the result of two factors. First, there is the relative lateral displacement caused by the different exposure to $\overline{V}$ of the two floats. This calculated by multiplying $\overline{V}$ by the difference in times required for ascent for the surface marker 200 and the float 74 from the sub-surface level, and which can be expressed as follows:

$$d_{a1} - d_{a2} = \overline{V} (t_{a1} - t_{a2}) \quad (3)$$

where $d_{a1}$ = the lateral displacement distance of the marker 200 occuring during ascent $d_{a2}$ = the lateral displacement distance of the float 74 occuring during ascent $t_{a1}$ = the time required for ascent of the marker 200 to the surface $t_{a2}$ = the time required for ascent of the float 74 to the surface, Second, there is the displacement that occurs while the marker 200 is floating on the surface, caused by $V_S$, and equal to $V_S$ multiplied by the time spent on the surface, and which can be expressed as follows:

$$d_s = V_s\, t_{s1} \tag{4}$$

where $d_s$ = the lateral displacement distance of the marker 200 occuring while such is floating on the surface and before float 74 surfaces $t_{s1}$ = the elapsed time between when the marker 200 appears on the surface and when the float 74 appears. With the ascent time for the surface marker 200, the ascent time for the float 74, and the time delay between the release of the two known from predetermination, the time on the surface for the marker 200 is easily calculated, and can be expressed as follows:

$$t_{s1} = t_{a2} + t_{d12} - t_{a1} \tag{5}$$

where $t_{d12}$ = the time delay between the release of the marker 200 and the release of the float 74. Once $V_S$ is found from the floats 74 and 76, therefore, which is done in the same manner as described earlier by using Equation (1), it is seen that it is a simple matter to calculate $\overline{V}$ from the final positions of the underwater float 74 and the underwater-released surface marker 200.

While it is believed that no detailed explanation as to how $\overline{V}$ is calculated need be given, since all that is involved is the application of common mathematical procedures, nevertheless in the interests of completeness a description of the procedures will be given. It will first be evident that Equation (3) can be rewritten to read as follows:

$$\overline{V} = d_{a1} - d_{a2}/t_{a1} - t_{a2} \tag{6}$$

In equation (6) $t_{a1}$ and $t_{a2}$ are of course known from predetermination, and $d_{a1} - d_{a2}$ can be calculated as follows:

$$d_{a1} - d_{a2} = (X_1 - X_2) - d_s \tag{7}$$

where $X_1$ = position of the marker 200 when data is collected $x_2$ = position of the float 74 when data is collected
As shown in Equation (4), $d_s = V_s\, t_{s1}$. This equation can be rewritten, using Equation (1) for solving $V_s$ and Equation (5) for solving $t_{s1}$, as follows:

$$d_s = X_2 - X_3/t_d\, (t_{a2} + t_{d12} - t_{a1}) \tag{8}$$

By now substituting Equations (7) and (8) into Equation (6), the following Equation results:

$$\overline{V} = (X_1 - X_2) - (X_2 - X_3)/t_d\, (t_{a2} + t_{d12} - t_{a1})/(t_{a1} - t_{a2}) \tag{9}$$

In equation (9), because all of the right hand terms are known, it is seen that a solution for $\overline{V}$ is readily obtained.

The embodiment of FIGS. 7 and 8 is, of course, substantially identical in concept to that of FIGS. 1–7, in that both use a combination of three float elements to determine both $V_S$ and $\overline{V}$ for a body of water. For some operations, using the technique of FIGS. 7 and 8, it may be desirable to use a multiplicity of underwater-released surface markers, perhaps with different buoyancies, to obtain more accurate data. In such instances the torpedo package is simply further modified to accommodate the necessary number of floats, and the mathematical solutions to $V_S$ and $\overline{V}$ are similar to those described herein. It is also readily apparent that when using the technique of FIGS. 7 and 8, the marker 200 could be released after the floats 74 and 76, rather than before. Exactly the same principles are involved in either arrangement, with the changes needed in Equations (3) through (9) being of the kind readily within the skill of any competant mathematician.

Obviously, many more variations and modifications of the present invention are also possible.

I claim:

1. The method of determining both the surface current velocity $V_s$, and the average current velocity $\overline{V}$ from a subsurface level to the surface, of a body of water, comprising the steps of: dropping three float markers into said body of water, the first of said markers remaining on the surface and the second and third of said markers sinking to said subsurface level and being designed to ascend automatically when released from said level; releasing said second marker, whereupon it rises to float on the surface; releasing said third marker at a predetermined time after release of said second marker, whereupon said third marker rises to float on the surface; charting the relative positions of said three markers on the surface of said body of water; determining $V_s$ by dividing the spacing between said second and said third markers by the time delay between the release thereof; and determining $\overline{V}$ by subtracting the spacing between said first and second markers from the product of $V_s$ multiplied by the predetermined elapsed time from the beginning of the descent to the end of the ascent of said second marker, and dividing the result by the predetermined sum of elapsed times of descent and ascent of said second marker.

2. The method as recited in claim 1, wherein said three markers all are designed to emit a dye to make clearly visible their surface position, and wherein said charting is accomplished by photography from the air.

3. The method as recited in claim 1, wherein said three markers are dropped as a single instrument package, said first marker detaching from said package at the surface and remaining on said surface.

4. The method of determining both the surface current velocity $V_s$, and the average current velocity $\overline{V}$ from a subsurface level to the surface, of a body of water, comprising the steps of: dropping three float markers into said body of water, all three of said markers sinking to said subsurface level and being designed to ascend automatically when released from said level, the first of said markers being designed to have a rate of ascent different than that of the second and third of said markers, and said second and said third markers being designed to have substantially identical rates of ascent; releasing said second marker, whereupon it rises to float on the surface; releasing said third marker at a predetermined time after release of said second marker, whereupon it rises at the same rate as said second marker to float on the surface; releasing said first marker at a predetermined time spaced from the release of said second and third markers, whereupon it rises at a different rate than said second and third markers to float on the surface; charting the relative positions of said three markers on the surface of said body of water; determining $V_s$ by dividing the spacing between said second and said third markers by the time delay between the release thereof; and determining $\overline{V}$ by adding to the spacing between said first and the nearest one of said second and third markers the product of $V_s$ multiplied by the predetermined time difference between when said first marker appeared on the surface and when said nearest one of said second and third markers appeared on the surface, and dividing the result by the predetermined difference in ascent times for said first marker and for the nearest one of said second and third markers.

5. The method as recited in claim 4, wherein said three markers all are designed to emit a dye to make clearly visible their surface position, and wherein said charting is accomplished by photography from the air.

6. An instrument package for use in determining the surface current velocity $V_s$, and the average current velocity $\overline{V}$ from a subsurface level to the surface, of a body of water, said instrument package being deposited into said body of water, and including: a first float; a second float; a third float; weighted housing means for carrying at least said second and third floats downwardly to a desired subsurface level after entry of said instrument package into said body of water, said first float being initially carried with said housing means so that all of said floats enter said body of water at the same time, and said second and third floats having tethers attached thereto; and timer means for releasing said second and said third floats in predetermined timed sequence from said subsurface level, said first float being arranged to separate from said carrying means and float on the surface at a predetermined time spaced from the release of said second and said third floats, and said second and third floats being designed to rise automatically to the surface when released, said timer means including: a housing; a clock mechanism within said housing, and including a shaft; and means for initially securing said tethers to said timer, and operable by said shaft for subsequently releasing said tethers in timed sequence.

7. An instrument package as recited in claim 6, wherein said first, said second and said third floats include means for marking their positions when floating on the surface readily determinable.

8. An instrument package as recited in claim 6, including additionally means for immobilizing said timer shaft; and means for releasing said immobilizing means during descent of said instrument package.

9. An instrument package for use in determining the surface current velocity $V_s$, and the average current velocity $\overline{V}$ from a subsurface level to the surface, of a body of water, said instrument package being deposited into said body of water, and including: a first float; a second float; a third float; weighted housing means for carrying said second and said third floats downwardly to a desired subsurface level after entry of said instrument package into said body of water, said first float being initially connected with said weighted housing means by a water soluble element, whereby said first float is automatically released upon deposit of said instrument package in said body of water; and means for releasing said second and said third floats in predetermined time sequence from said subsurface level, at predetermined times spaced from the release of said first float, said second and third floats being designed to rise automatically to the surface when released.

10. An instrument package as recited in claim 9, wherein said releasing means for said second and said third floats includes a timer carried within said weighted housing.

11. An instrument package as recited in claim 6, wherein said second and said third floats include means to guide them smoothly along an ascent path when released.

12. An instrument package as recited in claim 11, wherein said guide means comprises spiral shaped fins on said second and said third floats, designed to cause said floats to rotate as they rise through the water.

13. An instrument package for use in determining the surface current velocity $V_S$, and the average current velocity $\overline{V}$ from a subsurface level to the surface, of a body of water, said instrument package being deposited into said body of water and including: a torpedo housing open at one end and closed at the other; a pair of underwater floats received in said housing, and each having a tether extending therefrom; a timer received in the closed end of said housing and having means mounted thereon for releasably securing said tethers, said timer being operable to release said tethers in predetermined timed sequence, whereupon said underwater floats will automatically rise to the surface of said body of water; releasable means for immobilizing said timer, and operable upon descent of said instrument package into said body of water to start said timer; and a surface float releasably carried by said instrument package.

14. An instrument package as recited in claim 13, including additionally: an anchor weight; and a lanyard connecting said anchor weight with said closed end of said torpedo housing.

15. An instrument package as recited in claim 13, wherein each of said floats includes means to emit a signal whereby their position on the surface can be readily determined.

16. An instrument package as recited in claim 13, wherein said releasable means for immobilizing said timer includes: a release pin removably engageable with said timer; a trip cord connected at one end with said release pin; and a parachute connected to the other end of said trip cord.

17. An instrument package as recited in claim 16, wherein said torpedo housing has an opening in the side thereof, said trip cord being initially doubled, pulled outwardly through said opening, wrapped about said torpedo housing, and secured by water soluble means to form a capstan whereby said parachute cannot prematurely remove said release pin, said capstan arrangement being automatically released when said instrument package is deposited in the water.

18. An instrument package as recited in claim 16, wherein said surface float is initially connected with said parachute by water soluble means.

19. An instrument package as recited in claim 13, wherein each of said tethers has an enlarged anchor portion on the end thereof, and wherein said timer includes: a shaft connected with clockwork means to be rotated thereby; a base disk disposed with said shaft extending therethrough, and having a plurality of chambers therein for receiving said tether anchor portions; and a release disk overlying said base disk to nearly cover said chambers, said release disk being rotatable by said shaft, and having notch means therein registerable with said chambers upon rotation of said shaft to release said tether anchor portions.

20. An instrument package as recited in claim 19, wherein said base and said release disks have aligned openings therein, and wherein said releasable means includes a release pin removably received in said aligned openings.

21. An instrument package as recited in claim 13, wherein said underwater floats comprise: a hollow body tapered at both eends; at least one hollow flotation sphere received within said body; port means in said body for admitting water thereto; and fins on one end of said body.

22. An instrument package as recited in claim 21, wherein said fins are twisted into a spiral shape for imparting rotary motion to said float.

23. An instrument package as recited in claim 13, wherein said surface float is also received within said housing, and has a tether extending therefrom engageable with said timer to be released thereby.

24. An instrument package as recited in claim 23, wherein said surface float is substantially less buoyant than said underwater floats.

25. An instrument package as recited in claim 6, wherein said first float is also carried by said weighted housing means to said subsurface level and is designed to rise automatically to the surface when released, and wherein said releasing means is also operable to release said first float in predetermined timed sequence with said second and said third floats.

* * * * *